(12) United States Patent
Rozendal et al.

(10) Patent No.: US 8,715,504 B2
(45) Date of Patent: May 6, 2014

(54) PROCESS FOR REMOVING SULFIDE FROM ALKALINE WASHING LIQUIDS

(75) Inventors: René Alexander Rozendal, Hoorn (NL); Sjoerd Hubertus Josef Vellinga, Tjalleberd (NL); Erik van Zessen, Heerenveen (NL)

(73) Assignee: Paques I.P. B.V., Balk (NL)

( * ) Notice: Subject to any disclaimer, the term of this patent is extended or adjusted under 35 U.S.C. 154(b) by 321 days.

(21) Appl. No.: 12/809,728

(22) PCT Filed: Dec. 12, 2008

(86) PCT No.: PCT/NL2008/050795
§ 371 (c)(1),
(2), (4) Date: Sep. 10, 2010

(87) PCT Pub. No.: WO2009/082205
PCT Pub. Date: Jul. 2, 2009

(65) Prior Publication Data
US 2011/0011799 A1   Jan. 20, 2011

(30) Foreign Application Priority Data

Dec. 20, 2007   (EP) ..................................... 07123809

(51) Int. Cl.
*C02F 1/469* (2006.01)
*C02F 9/06* (2006.01)

(52) U.S. Cl.
USPC ...... 210/631; 210/670; 210/748.01; 210/638; 210/243; 210/259

(58) Field of Classification Search
USPC ............ 210/631, 660, 670, 748.01, 634, 638, 210/321.72, 321.7, 758, 151, 202, 243, 210/259; 204/520, 522, 523, 630, 631, 633, 204/634, 450, 600, 194
See application file for complete search history.

(56) References Cited

U.S. PATENT DOCUMENTS

| | | | | |
|---|---|---|---|---|
| 3,711,392 | A * | 1/1973 | Metzger ........................ | 210/603 |
| 4,253,928 | A * | 3/1981 | Blytas et al. .................. | 204/530 |
| 5,324,403 | A * | 6/1994 | Kennedy et al. .............. | 204/525 |
| 5,954,935 | A * | 9/1999 | Neumeister et al. .......... | 204/632 |
| 6,045,695 | A * | 4/2000 | Janssen et al. ................ | 210/611 |
| 2004/0000491 | A1* | 1/2004 | Kovarsky et al. ............. | 205/291 |

FOREIGN PATENT DOCUMENTS

| | | |
|---|---|---|
| DE | 4306104 A1 | 9/1994 |
| EP | 0013050 A | 7/1980 |
| JP | 06 205944 A | 7/1994 |
| JP | 09 103799 A | 4/1997 |

OTHER PUBLICATIONS

Basic Principles of Membrane Technology, 1997, Kluwer Academic Puplisher, p. 391.*
Basoc Electrical Engineering col. 1, 1985, Tata MeGaw-Hill, p. 162.*
Jamaluddin et al, "Salt Extration from Hydrogen Sulfide Scubber Solution Using Electrodialysis," 2995, AIChE Journal, vol. 41, No. 5, pp. 1194-1202.*
MahMood et al, "Sources of sulfide in waste streams and current biotechnologies for its removal," 2007, Journal of Zheijiang University Science A, pp. 1162-1140.*
"Water Management for Reuse/Recycle", Power, 991-05-01, pp. 13-14,16,18, vol. 135, No. 5, McGraw-Hill Compagny, New York, NY, US, XP000226902.
International Search Report in Corresponding Application No. PCT/NL2008/050795 Dated Apr. 16, 2009.

* cited by examiner

*Primary Examiner* — Nam Nguyen
*Assistant Examiner* — Claire Norris
(74) *Attorney, Agent, or Firm* — Young & Thompson

(57) ABSTRACT

Alkaline solutions resulting from extracting sulfide from hydrocarbon fluids can be treated in a combination of one or more electrodialysis cells and a bioreactor. The electrodialysis cell (2) includes an anode (4), a cathode (5), an electric power supply (7) and a first (12) and a second (11) compartment separated from each other by an anion exchange membrane (9). The alkaline solution is fed into the first compartment at the cathode side and the diluate (sulfide-depleted stream) leaving the first compartment has a lowered sulfide content and can be reused as the alkaline extractant solution. The concentrate (sulfide-enriched stream) leaving the second compartment is treated in the bioreactor (3) for removing sulfide and is then returned.

20 Claims, 2 Drawing Sheets

PROCESS FOR REMOVING SULFIDE FROM ALKALINE WASHING LIQUIDS

FIELD OF THE INVENTION

The invention relates to the treatment of sulfidic spent caustics by a combination of membrane electrodialysis and biological oxidation. This results in the removal of sulfides from the sulfidic spent caustics and the production of a reusable alkaline scrubber solution and a reusable elemental sulfur stream.

BACKGROUND

In the (petro)chemical industry, alkaline solutions (e.g. sodium hydroxide) are typically used to remove sulfur compounds (e.g. $H_2S$) from hydrocarbon streams. This is typically done in a sulfide scrubber. Although this method is very effective in removing sulfur compounds, it results in an alkaline stream with a pH of more than 12 that is contaminated with large amounts of sulfide ($S^{2-}$) and smaller amount of other compounds (e.g. mercaptans, BTEX, and phenols). These contaminated alkaline waste streams are referred to as sulfidic spent caustics. Traditionally, sulfidic spent caustic streams are treated by means of wet air oxidation. During wet air oxidation all reduced sulfur species are oxidised with air to sulfate and/or thiosulfate. Furthermore, the other compounds (e.g. mercaptans, BTEX, and phenols) are also oxidised to form carbon dioxide (and more sulfate and/or thiosulfate). Although wet air oxidation can be very effective in treating the sulfidic spent caustics, it is only so at high temperatures and pressures, which means that the energy costs and operational costs of the process are high. Furthermore, wet air oxidation does not allow the reuse of the alkaline solution as the oxidation of the sulfur species to sulfate and/or thiosulfate results in the production of acid and loss of alkalinity.

Sulfidic spent caustics can also be treated by means of membrane electrolysis as described in WO99/34895 (=U.S. Pat. No. 6,132,590). According to this process, the oxidisable sulfur species (e.g. sulfide and mercaptans) are oxidised at the anode in the anode compartment of an electrolysis cell. This oxidation reaction produces oxidised sulfur species (e.g. sulfur, sulfate and disulfides). The anode compartment is separated from the cathode compartment by means of a cation exchange membrane. When an electrical current flows, this membrane transports cations (e.g. sodium ions) from the anode to the cathode compartment. The cathode compartment is continuously fed with deionised water. In the cathode compartment the sodium ions from the anode compartment combine with hydroxyl ions produced in the cathode reaction. This turns the deionised water into an alkaline stream. This alkaline stream can be reused in the caustic scrubber.

Unfortunately, this process has several disadvantages. First of all, there is a severe risk of sulfur accumulation on the electrode causing an increase of the electricity consumption by the electrolysis cell due to an increase of the anode resistance. Secondly, not all the sodium ions can be retrieved from the influent as that would cause a strong increase of the anolyte resistance (if all the sulfide is converted to sulfur). This increase of the anolyte resistance would again increase the electricity consumption to unacceptable levels. If not all sodium ions can be retrieved, however, a make-up sodium hydroxide stream is required to operate the caustic scrubber. Thirdly, if the sulfur accumulation can be prevented by converting all sulfide to sulfate, a strong acidification of the effluent can be expected that requires neutralization. This unfortunately consumes a large part of the produced alkaline. Finally, the remaining solution will require additional treatment as it will still contain disulfides and sulfate.

Alternatively, the sulfidic spent caustics can be treated through the biological oxidation of sulfide by aerobic Thiobacilli as described in WO98/04503. This oxidation can be represented by the following equations:

$$HS^- + 0.5 O_2 \rightarrow S^0 + OH^- \qquad (I)$$

$$HS^- + 2 O_2 \rightarrow SO_4^{2-} + H^+ \qquad (II)$$

In reaction (I) sulfur is formed with an increase of pH, whereas in reaction (II) sulfate is formed with a drop in pH. As can be seen from reaction (I), the alkalinity in principle can completely be recovered if the biological oxidation completely proceeds through equation (I), which means that theoretically the treated stream can be reused as alkaline scrubber liquid and the produced sulfur can be reused (e.g. for sulfuric acid production, as a fungicide, as a soil fertiliser, etc). A drawback of this system, however, is the fact that the microorganisms can be severely inhibited by the other compounds (e.g. mercaptans, BTEX, and phenols) that are also often present in sulfidic spent caustic streams. Furthermore, this method can only be reliably applied at pH values below 10.

This means that a large part of the sulfide needs to be converted to sulfate (instead of sulfur) according to reaction (II) in order to lower the pH. Sulfur normally occurs as a suspended solid in the water phase and, therefore, it can be easily separated from the treated stream and reused. Sulfate, however, will remain in solution and will accumulate when the stream is recycled for reuse in the sulfide scrubber. Furthermore, a pH of below 10 makes reuse of the treated stream as alkaline scrubber liquid unfeasible as the sulfide scrubbers often need to be operated at pH values above 12.

DESCRIPTION OF THE INVENTION

The invention concerns a process that is capable of treating sulfidic spent caustics by a combination of membrane electrodialysis and biological oxidation. This results in the removal of sulfides from the sulfidic spent caustics stream and the production of a reusable alkaline solution and a reusable elemental sulfur stream. Thus, the invention pertains to a process for removing sulfide from an alkaline sulfidic liquid comprising:

- subjecting the sulfidic liquid to electrodialysis using an anion exchange membrane;
- subjecting sulfide-enriched stream (concentrate) of said electrodialysis to biological oxidation;
- using sulfide-depleted stream (diluate) of said electrodialysis as an alkaline liquid.

The invention also pertains to an installation for the treatment of sulfidic alkaline liquids, comprising (a) an electrodialysis cell comprising at least an anode, a cathode, an electric power supply and a first and a second compartment separated from each other by an anion exchange membrane, and (b) a bioreactor in fluid connection with said second compartment, and (c) a source of sulfidic alkaline liquid in fluid connection with said first compartment.

Thus, the process of the invention comprises contacting a spent sulfide-containing alkaline liquid with the cathode side of an anion exchange membrane. This contacting takes place in a first compartment of an electrodialysis cell, which is separated from a second compartment by the anion exchange membrane. The first compartment is located at the cathode side of the anion exchange membrane and the second compartment is located at the anode side of the anion exchange membrane. As used herein, 'cathode side' and 'anode side' are relative terms referring to an electrodialysis cell comprising at least a cathode, a first compartment, an anion exchange membrane, a second compartment and an anode. Thus the cathode side of a membrane is the side towards the cathode of the electrodialysis cell. Being located at the cathode side of a membrane or compartment or other member being closer to the cathode than said membrane, compartment, or other member and being further away from the anode than said membrane, compartment or other member.

The spent alkaline sulfide-containing liquid, also referred to as sulfidic spent caustic, is an aqueous liquid, i.e. containing, in addition to the sulfide load, at least 70%, usually at least 80% of water, together with alkali (e.g. sodium hydroxide) and possibly other alkaline and/or water-soluble or water-dispersible components. It can originate from an extraction of hydrocarbon fluids containing sulfides and/or other sulfur compounds. The pH of the sulfidic liquid is at least 11, usually at least 12, in particular between 12.5 and 14, and the same pH applies in the first compartment.

Where reference is made to 'sulfide', this includes divalent sulfur in any form, be it neutral hydrogen sulfide, monoanionic hydrosulfide ($HS^-$), or dianionic sulfide ($S^{2-}$), the anions being balanced by cation species. The actual form of sulfide will mainly depend on the pH of the medium. Thus, it will predominantly be present as $S^{2-}$ in the alkaline liquid in the scrubber and the first compartment (diluate), but predominantly as hydrosulfide in the concentrate present in the second compartment and in the bioreactor.

The hydrocarbon fluid can be gaseous or vaporous, in which case the extraction (washing) is typically performed in a gas scrubber. The (gaseous) hydrocarbon fluid is intimately contacted with the alkaline liquid, usually in counter-current by spraying the alkaline liquid downward through an up-flowing hydrocarbon gas or vapour stream. The hydrocarbon fluid can also be liquid, in which case the extraction is typically performed in a liquid/liquid extractor involving thorough mixing of the hydrocarbon liquid with the alkaline extraction liquid, and a downstream settler for allowing separation of the treated hydrocarbon liquid and the (spent) alkaline liquid. Where reference is made below to 'scrubbing' and 'scrubber', these terms primarily relate to extracting gases, but they extend to extracting liquids, thus also covering 'extracting' and 'extractor'.

The hydrocarbon fluid can be any hydrocarbon, such as alkanes (paraffins), cyclo-alkanes, alkenes (olefins), aromatic components, polyunsaturates etc. The term 'hydrocarbon' as used herein does not exclude the presence of oxygenated, chlorinated and/or other modified hydrocarbons, or other components such as hydrogen, carbon dioxide, provided that the hydrocarbon fluid is substantially immiscible with water or alkaline aqueous liquids.

Subjecting the sulfidic alkaline liquid to electrodialysis according to the invention comprises contacting the sulfidic liquid to an anion exchange membrane at the cathode side thereof under process conditions, involving a voltage over the membrane. This contact results in transport of sulfide ions and possibly other anions through the anion exchange membrane, thus lowering the sulfide concentration of the alkaline liquid at the cathode side of the membrane. The resulting liquid in the first compartment (cathode side of the anion exchange membrane), i.e. the sulfide-depleted stream leaving the electrodialysis, is referred to herein as the diluate according to conventional electrodialysis terminology. The diluate has a lowered sulfide content compared to the spent alkaline liquid entering the first compartment. The lowered sulfide content is preferably less than 50%, preferably less than 30%, most preferably less than 15%, of the sulfide content in the spent alkaline liquid. In absolute terms, the treated alkaline liquid has a sulfide content of lower than 0.2 molar, or preferably lower than 0.1, or even lower than 0.05 molar sulfide, corresponding to about less than 6.5 g, less than 3.2 g or less than 1.6 g, respectively of sulfide per liter. The sulfide-depleted stream (diluate) can be reused for extracting gaseous or liquid hydrocarbon streams. The degree of lowering of the sulfide content by the electrodialysis step will depend on the desired (maximum) sulfide concentration of the treated alkaline extraction liquid versus the power consumption and further performance parameters of the electrodialysis process.

The sulfide-enriched stream, i.e. the liquid present at the anode side of the anion exchange membrane, is referred to herein as the concentrate. It is carried off from (the second compartment of) the electrodialysis cell to a bioreactor, where sulfide is oxidised to elemental sulfur as described below. The liquid effluent of the bioreactor has a low sulfide content and is returned to the second compartment. The sulfide content is preferably below 15 mg/l, more preferably less than 5 mg/l, most preferably less than 1 mg/l.

Figure 1:
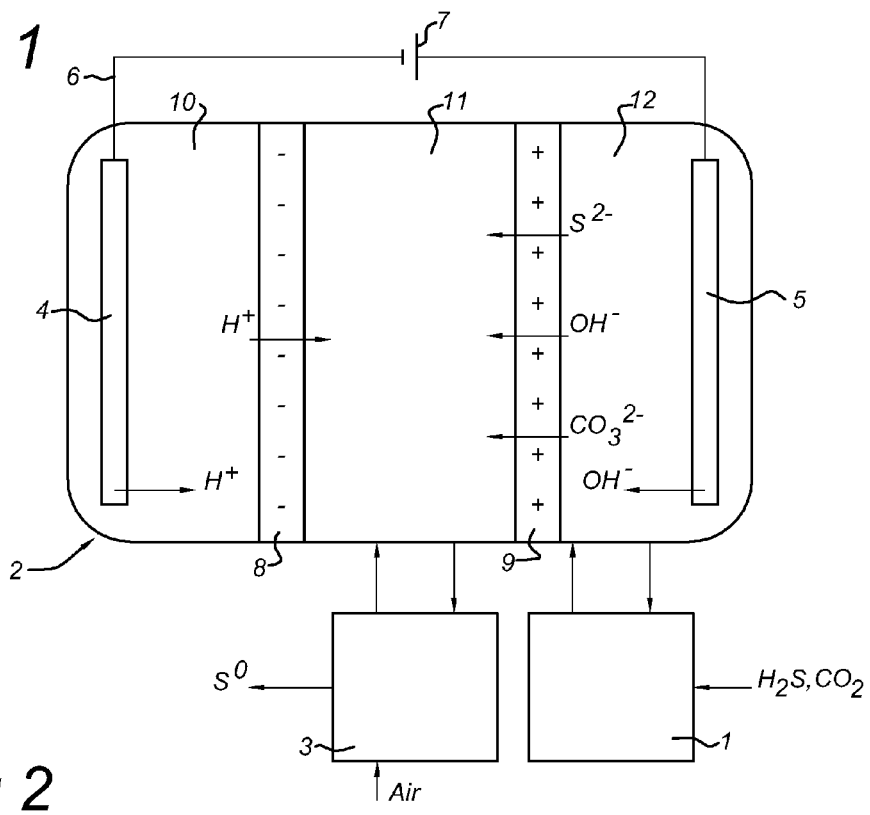
FIG. 1 is a schematic illustration of an embodiment of the invention.

In a first embodiment of the invention, the process scheme can be configured according to FIG. 1. In this embodiment of the invention, a coupling can be made between a caustic scrubber 1, a membrane electrodialysis cell 2, and a biological sulfide oxidation reactor 3. The membrane electrodialysis cell comprises an anode 4 and a cathode 5 connected by an electrical circuit 6 containing a power supply 7. The membrane electrodialysis cell can be divided into three compartments by a cation exchange membrane 8 and an anion exchange membrane 9. The anode compartment 10 contains an electrolyte suitable for the anode reaction, the second (middle) compartment 11 is fed with biological reactor medium returned from the biological sulfide oxidation reactor, and the cathode compartment 12 is fed with the sulfidic spent caustics from the caustic scrubber. The effluent from the middle compartment is fed to the biological sulfide oxidation reactor and the effluent of the cathode compartment is directed towards the caustic scrubber.

Where reference is made herein to an anion exchange membrane, this means a membrane which is selectively permeable to anions. Suitable anion exchange membranes typically comprise polymer backbones to which quaternary ammonium groups are attached, such as styrene-divinylbenzene copolymers or vinylpyridine polymers carrying trimethylammoniomethyl substituents. Examples of anion exchange membranes include Aciplex A201 (Asahi Chemical Industry Co., JP), Selemion ASV (Asahi Glass Co. Ltd, JP), FAS (Fuma-tech, GmbH, DE), AR204szra (Ionics, Inc, USA) and Neosepta AM-I (Tokuyama Co., JP) or other materials which have a selectivity for ions and a selectivity of anions over cations.

Where reference is made herein to a cation exchange membrane, this means a membrane which is selectively permeable to cations. Examples of suitable cation exchange membranes include polymers containing carboxylic or sulfonic groups (e.g. polyether-sulfone (PES), polysulfone (PSf), polyetheretherketone (PEEK), polystyrene (PS), polyethylene (PE), polytetrafluoroethylene (PTFE, e.g. Nafion), cation exchange membranes based on resins (e.g. polymer-clay composite materials) or other materials which have a selectivity for ions and a selectivity of cations over anions.

Electrodes for use in the electrodialysis can be selected by the skilled person from commercially available electrodes. Examples of suitable cathode materials include graphite, carbon, metal such as titanium, steel, coated metal, etc. Examples of anode materials include graphite, carbon, metal such as titanium, coated metal, etc. Suitable anodes are available e.g. from Magneto special anodes BV (Schiedam, NL).

When sufficient voltage is applied over the membrane electrolysis cell, current will flow through the electrical circuit and electrochemical reactions occur at the anode and the cathode. Typically, the anode reaction will be an electrochemical oxygen-producing reaction, which generates protons in equal amounts with electrons:

$$2H_2O \rightarrow O_2 + 4H^+ + 4e^- \qquad (III)$$

Typically, the cathode reaction will be an electrochemical hydrogen producing reaction, which generates hydroxyl ions in equal amounts with the consumption of electrons:

$$4H_2O + 4e^- \rightarrow 2H_2 + 4OH^- \qquad (IV)$$

In general, a current density of 10-1000 A per $m^2$ of membrane surface will be applied, more preferably a current density between 50 and 200 A/$m^2$. Hence, a sufficient voltage will be in the range of between 0.2 and 2.0, in particular about 1-1.5 V over a combination of an anion exchange membrane and a cation exchange membrane. For the anode and cathode reactions a voltage of between 1.5 and 3 V, especially between 2 and 2.5 V will be required, resulting in a total voltage over the cell of between about 2.5 and 4.5, especially between 3 and 4 V.

As a result of this flowing current, ions will migrate from one compartment to another in such a way that the electroneutrality of the system is maintained. This means that cations will flow through the cation exchange membrane from the anode compartment into the middle compartment and anions will flow through the anion exchange membrane from the cathode compartment into the middle compartment. When an acidic electrolyte, especially an inorganic acid such a sulfuric acid or phosphoric acid, in a preferred concentration of between 1 and 3 molar, is used in the anode compartment, predominantly protons will flow through the cation exchange membrane from the anode compartment into the middle compartment. At the same time these protons are replenished in the anode compartment by the anode reaction (III).

The ion species flowing through the anion exchange membrane from the cathode compartment into the middle compartment are determined inter alia by the anion composition of the sulfidic spent caustics stream. A typical sulfidic spent caustics stream will mainly contain sulfide in the range of e.g. 0.1-0.5 molar, carbonate in the range of e.g. 0.5-1.0 molar, and hydroxyl ions in the range of e.g. 0.05-0.25 molar as anions. These anions are typically counterbalanced by e.g. 1.5-3 molar of alkali metal, especially sodium, cations. All of these anions will migrate through the anion exchange membrane to the middle compartment. In the middle compartment, the negative charge of the anions is counterbalanced by the positively charged protons coming from the anode compartment. At the same time, in the cathode compartment, the hydroxyl ions that are produced in the cathode reaction compensate for the migration of anions from the cathode compartment into the middle compartment. This effectively replaces the sulfide and carbonate by hydroxyl ions in the sulfidic spent caustics and thereby produces an alkaline solution that can be reused in the caustic scrubber.

Typical sulfide concentrations in the middle compartment (concentrate), subsequently fed to the biological reactor, are in the range of 100 mg per l up to 5 g per l, preferably up to 3 g per l (about 3 to 100 mmol/l). Concentrations outside these ranges may be accommodated, but will generally lead to some side reactions. As a result of the charge compensation by protons, the pH in the middle compartment (7.5<pH<9.5) produces one additional proton per sulfide:

$$S^{2-} + 2H^+ \rightarrow HS^- + H^+ \qquad (V)$$

and for carbonate and hydroxyl ions:

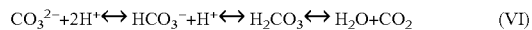

$$CO_3^{2-} + 2H^+ \leftrightarrow HCO_3^- + H^+ \leftrightarrow H_2CO_3 \leftrightarrow H_2O + CO_2 \qquad (VI)$$

$$OH^- + H^+ \rightarrow H_2O \qquad (VII)$$

The effluent from the middle compartment is directed towards the biological sulfide oxidation reactor, where the sulfide is converted with air according to reactions (I) and (II). As the invention allows for a decoupling of the caustic scrubber solution and the biological medium, the biological reactor can be operated such that most of the sulfide is converted through reaction (I). This reaction produces one additional hydroxyl ion per sulfide ion, which compensates for the additional proton that is transported according to reaction (V). Therefore, if most of the biological oxidation can be directed towards reaction (I), the biological oxidation can be operated with very limited alkaline dosing for pH control. The biological oxidation reactor is provided with the necessary liquid inlet and outlet for connection with the second compartment and with an air inlet, an air distribution device and a gas outlet for introducing and handling the required amount of oxygen. The biological oxidation reactor is furthermore provided with a solid separation means (settler or the like) for separating off elemental sulfur.

Direction towards reaction (I) can be effected by using a limiting oxygen concentration of e.g. within the range of 0.01-1.0 mg per liter, or by using a low redox potential of below −360 mV (Ag/AgCl). Details on the typical operation conditions for achieving this are described in WO92/10270, WO96/30110, WO94/29227, WO98/04503, and WO97/43033. Various types of suitable biological reactors are available, the most suitable one being determined inter alia by the amount of sulfide to be treated. For large scale and high-sulfur processes, a so-called Circox type reactor is very suitable (see WO94/29227).

As the middle compartment is separated from the cathode compartment by the anion exchange membrane, the biological oxidation reactor (7.5<pH<9.5) can be operated at a lower pH than that of the alkaline solution that is redirected towards the caustic scrubber. The preferred pH in the biological reactor is between 6 and 10.5, preferably between 7.5 and 9.5. Known autotrophic aerobic cultures, such as cultures of the genera *Thiobacillus* and *Thiomicrospira*, can be used as bacteria oxidising sulfide to elemental sulfur at these pH values. For relatively high pH values, e.g. up to 10.5, alkaliphilic sulfide-oxidisers such as the genera *Thioalkalimicrobium* and *Thioalkalivibrio*, described in WO97/43033, can be used.

Furthermore, the micro-organisms are not affected by many of the other compounds (e.g. BTEX) that are also often present in sulfidic spent caustic streams, as these compounds are typically non-charged and therefore remain in the cathode compartment. Consequently, the sulfur produced by the process of the invention will typically be a very clean type of sulfur, which is very suitable for reuse. Overall, the invention therefore results in the removal of sulfides from the sulfidic spent caustics stream and the production of a reusable alkaline solution for the caustic scrubber and a reusable elemental sulfur stream.

Figure 2:
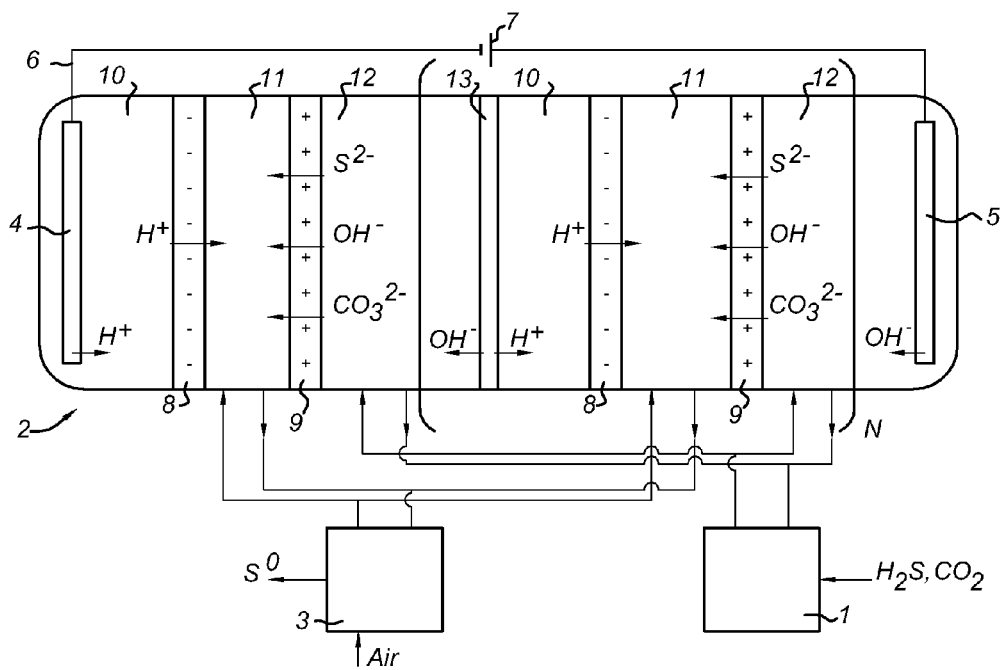
FIG. 2 is a schematic illustration of another embodiment of the invention.

To increase the treatment capacity, multiple units configured according to in FIG. 1 can be connected in parallel or in series to each other by using electrical wiring. Alternatively, in another aspect of the invention, the units can be connected in series according to the configuration that is depicted in FIG. 2 (N≥1). The units that are configured according to FIG. 2 are connected to each other by means of bipolar electrodes 13. Bipolar electrodes function as a cathode on one side and as an anode at the other side of the electrode. The number (N) of cells can vary from 2 up to e.g. 1000. Very suitable units of stacked cells contain 100 to 200 cells and can further be combined to e.g. 5×200 installations. The total voltage difference over the stacked cells can be N times the voltage over a single cell, e.g. N×3.5 V.

In another embodiment of the invention, the configurations of FIG. 1 and FIG. 2 can be altered by removing the cation exchange membrane(s) 8. However, this will increase the risk of sulfur accumulation on the electrode surface, which will create an increase of electricity consumption and/or the need for regular cleaning of the electrodes. As a consequence, the feasibility of a cell lacking the cation exchange membrane will depend on the nature, especially the sulfide content of the concentrate (sulfide-enriched stream) and of the operation mode.

Figure 3:
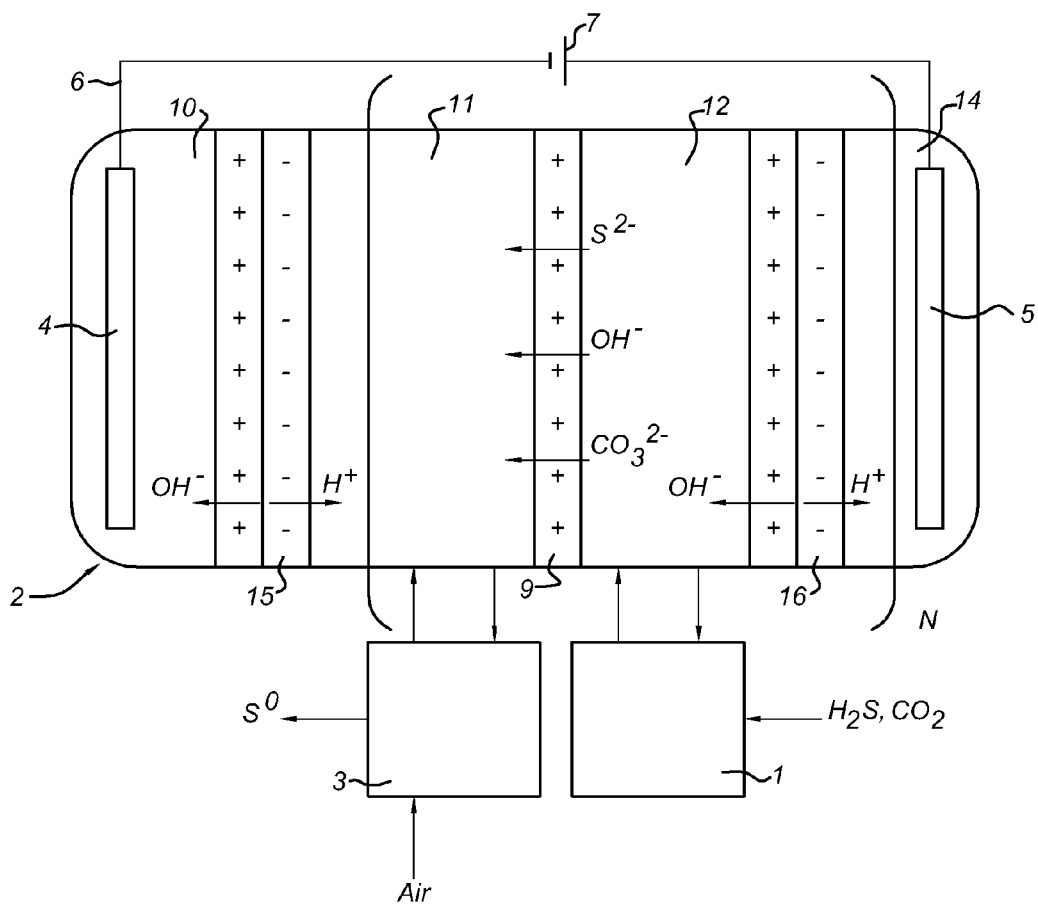
FIG. 3 is a schematic illustration of another embodiment of the invention.

In yet another aspect of the invention, the process scheme is configured according to FIG. 3. Also in this configuration, the invention couples the caustic scrubber 1, the membrane electrodialysis cell 2, and a biological sulfide oxidation reactor 3. Again, the membrane electrodialysis cell comprises an anode 4 and a cathode 5 connected by an electrical circuit 6 containing a power supply 7. However, different from the configuration in FIG. 1, the membrane electrodialysis cell in the configuration in FIG. 3 (N=1) is divided into four compartments by a bipolar membrane 15, anion exchange membrane 9, and bipolar membrane 16, thus creating a separate cathode compartment 14. Furthermore, the capacity can be increased by creating more compartments, including more pairs of anion exchange membranes 9 and bipolar membranes 16 as schematically depicted in FIG. 3 (N>1). The number N can again vary from 1 up to several hundreds or even 1000, e.g. combinations of 200 units. This constitutes a preferred embodiment of the invention, for example with units comprising between 25 and 500 membrane pairs.

The anode compartment 10 and the cathode compartment 14 of the cell depicted in FIG. 3 contain an electrolyte suitable for the anode reaction and cathode reaction respectively. The one or more compartments 11 are the sulfide collection compartments corresponding to the second compartment of the configuration of FIGS. 1 and 2. Compartments 11 are fed with biological medium coming from the biological sulfide oxidation reactor 3. The one or more compartments 12 are the sulfide removal compartments corresponding to the first compartment of the configuration of FIGS. 1 and 2. Compartments 12 are fed with the sulfidic spent caustics coming from the caustic scrubber 1. The effluent coming from the sulfide collection compartments 11 (concentrate, sulfide enriched stream) is fed to the biological sulfide oxidation reactor 3 and the effluent of the sulfide removal compartments (diluate, sulfide-depleted stream) is reused in the caustic scrubber 1.

A bipolar membrane consists of an anion and a cation exchange layer on top of each other. According to the invention the bipolar membranes is oriented such that the cation exchange layers are oriented towards the cathode and the anion exchange layers are oriented towards the anode. The working principle of a bipolar membrane is based on the diffusion of water in between the anion and cation exchange layer and the subsequent splitting of this water inside the membrane into hydroxyl ions and protons:

$$H_2O \rightarrow OH^- + H^+ \qquad (VIII)$$

Subsequently, the hydroxyl ions migrate in the direction of the anode and the protons migrate in the direction of the cathode. Examples of suitable bipolar membranes include Fuma-tech FT-FBI (Fuma-Tech, GMBH, Germany), Neosepta BP-I (Tokuyama Co., Japan).

When sufficient voltage is applied over the membrane electrolysis cell, current will flow through the electrical circuit and electrochemical reactions occur at the anode and the cathode. A sufficient voltage is in the order of 0.5 to 2.5 V per combination of an anion exchange membrane and a bipolar membrane, especially between 1 and 2 V. The typical anode and cathode reactions will be similar to those described for FIGS. 1 and 2. The total voltage of the cell according to FIG. 3 is thus N times the voltage over a combination of an anion exchange membrane and a bipolar membrane plus the voltage required for the anode and cathode reactions, totaling to e.g. 2 V+N×1.5 V.

As a result of the flowing current, water will be split inside the bipolar membranes and ions will migrate in such a way that the electroneutrality of the system is maintained. This means that anions will flow through the anion exchange membrane from the sulfide removal compartment(s) 12 into the sulfide collection compartment(s) 11. The bipolar membrane 15 adjacent to the anode compartment 10 will produce hydroxyl ions that will migrate into the anode compartment 10 and will neutralise the protons produced in the anode reaction (III). Furthermore, bipolar membrane 16 adjacent to the cathode compartment 14 will produce protons that will migrate into the cathode compartment 14 and will neutralise the hydroxyl ions produced in the cathode reaction (IV). Furthermore, the bipolar membranes 15 and bipolar membranes 16 that are not adjacent to the cathode compartment (i.e. then $1^{st}$ up to the $(N-1)^{th}$ membrane 16 when N>1) will produce protons, which migrate into the sulfide collection compartments 12. This is similar to the function of the cation exchange membranes in FIGS. 1 and 2. In the sulfide collection compartments, the protons counterbalance the negative charge of the anions coming through the anion exchange membranes 9 from the sulfide removal compartments 12. Similar to FIGS. 1 and 2, the ion species flowing through the anion exchange membrane from the sulfide removal compartments into the sulfide collection compartments are determined inter alia by the anion composition of the sulfidic spent caustics stream. A typical sulfidic spent caustics stream will contain sulfide, carbonate, and hydroxyl ions as anions. All of these components will migrate through the anion exchange membrane to the sulfide collection compartment(s) and react with protons, coming from the bipolar membrane, according to reactions (V), (VI), and (VII).

The bipolar membranes 16 will produce hydroxyl ions, which migrate into the sulfide removal compartments 12. This is similar to the function of the cathode in FIG. 1 and FIG. 2. In the sulfide removal compartments 11, the hydroxyl ions compensate for the negative charge of the anions migrating through the anion exchange membranes 9 from the sulfide removal compartments into the sulfide collection compartments. Similar to FIGS. 1 and 2, the net result of the configuration in FIG. 3 is that the sulfide and carbonate in the sulfidic spent caustics are effectively replaced by hydroxyl ions and thereby an alkaline solution is produced that can be reused in the caustic scrubber.

The subsequent biological oxidation of the sulfide collected in the sulfide collection compartments will be identical to that described for the sulfide collected in the middle compartment of FIGS. 1 and 2. Again, because the sulfide collection compartment is separated from the sulfide removal compartment by the anion exchange membrane, the biological oxidation reactor can be operated at a lower pH than that of the alkaline solution that is redirected towards the caustic scrubber. Furthermore, the micro-organisms are not affected by many of the other compounds (e.g. BTEX) that are also often present in sulfidic spent caustic streams, as these compounds are typically non-charged and therefore remain in the cathode compartment. Therefore, also when the invention is configured according to FIG. 3, it results in the removal of sulfides from the sulfidic spent caustics stream and the production of a reusable alkaline solution for the caustic scrubber and a reusable elemental sulfur stream.

If necessary, the performance of all configurations (FIGS. 1, 2 and 3 and further variants) can be improved by including a membrane filtration unit after the biological treatment to prevent sulfur from entering into the membrane electrodialysis cell. This filtration unit can thus be located in the return line from the biological sulfide oxidation reactor 3 to the second compartment 11 (not shown in the figures). Alternatively or additionally, if certain compounds (e.g. mercaptans, BTEX, organic acids and phenols) that are also present in sulfidic spent caustics accumulate to problematic levels in the sulfidic spent caustics, the performance of all configurations (FIGS. 1, 2 and 3) can be improved by removing these compounds through pretreatment or post-treatment of the sulfidic spent caustics stream. For example, the sulfidic spent caustics stream can be pretreated or post-treated with activated carbons (see e.g. http://www.sentryair.com/activated-carbon-filter.htm), organic solvents, or selective adsorption materials to remove these compounds. Hence, an adsorption unit, e.g. containing activated carbon, can be located in the line from the scrubber 1 to or in the return line from the first compartment 12 to the scrubber 1 (not shown in the figures).

Furthermore, some organic compounds (e.g. mercaptans, organic acids or phenols) might dissociate in the caustic scrubber liquid and form negatively charged ions that are also transported through the anion exchange membrane (e.g. methanethiol: $CH_3SH+OH^- \rightarrow CH_3S^- +H_2O$). If these compounds accumulate to problematic levels in the biological oxidation reactor, these compounds can be treated in a side-stream of the biological oxidation reactor in a separate reactor (e.g. through biological aerobic treatment or through limited oxidation using organisms capable of converting methylated compounds such as bacteria of the genus *Methylophaga*, e.g. *M. sulfidovorans*). Alternatively, these components can be removed with activated carbons (see e.g. http://www.sentryair.com/activated-carbon-filter.htm), organic solvents, or selective adsorption materials to remove these compounds). Thus, the biological oxidation reactor 3 may be provided with a liquid outlet connected to a further biological oxidation reactor or an adsorption unit for removing such organic compounds such as mercaptans, organic acids or phenols, with a return line from said further oxidation reactor or adsorption unit to the reactor 3.

Finally, if the biological oxidation does not completely proceed according to reaction (I) but also partially according to reaction (II) (e.g. for 5%), or if other oxidised sulfur species are present, the performance of all configurations (FIGS. 1, 2 and 3) can be improved by converting the produced sulfate etc. to sulfide in an additional biological sulfate reduction reactor (e.g. WO96/30110). This reactor can be fed with the hydrogen produced in the cathode reaction (IV). The sulfate will then be reduced to sulfide according to:

$$SO_4^{2-}+4H_2 \rightarrow S^{2-}+4H_2O \tag{IX}$$

This sulfide can subsequently be recycled to the sulfide oxidation reactor and converted to sulfur according to reaction (I). In this embodiment, the biological oxidation reactor 3 is provided with a liquid outlet connected to an anaerobic reactor containing sulfate-reducing bacteria, with a return line from said anaerobic reactor to the reactor 3. The anaerobic reactor further comprises an inlet for an electron donor (e.g. hydrogen from the cathode compartment) and optionally a gas outlet and/or a bleed outlet.

The invention claimed is:

1. A process for removing sulfide from an alkaline sulfidic liquid, comprising:
   providing an electrolysis cell comprising a means for producing protons having an anode, a means for producing hydroxyl ions having a cathode, and an anion exchange membrane;
   subjecting the sulfidic liquid to electrolysis in said electrolysis cell, producing a sulfide-enriched concentrate at the anode side of said anion exchange membrane and a sulfide-reduced diluate at the cathode side of said anion exchange membrane,
   wherein the protons produced by said means for producing protons adjust the pH of the sulfide-enriched concentrate to between 6 and 10.5, and the hydroxyl ions produced by said means for producing hydroxyl ions adjust the pH of the sulfide-reduced diluate to at least 11;
   subjecting the sulfide-enriched concentrate to biological oxidation in a biological sulfide oxidation reactor; and
   recycling the sulfide-reduced diluate having a pH of at least 11 as an alkaline liquid.

2. The process according to claim 1, wherein the alkaline sulfidic liquid is a product of scrubbing a hydrocarbon fluid with the alkaline liquid.

3. The process according to claim 1, wherein said biological oxidation comprises selective oxidation of the sulfides to elemental sulfur, which is separated off as a solid, and the remaining liquid is returned to said electrolysis.

4. The process according to claim 1, wherein said electrolysis cell comprises at least three compartments:
   a first compartment into which the alkaline sulfidic liquid is introduced and from which the sulfide-reduced diluate is carried off;
   a second compartment, at the anode side of said first compartment and separated from said first compartment by said anion exchange membrane, from which the sulfide-enriched concentrate is carried off; and
   a third compartment, at the anode side of said second compartment and separated from said second compartment by a cation exchange membrane or a bipolar membrane.

5. The process according to claim 4, wherein
   said means for producing protons and said means for producing hydroxyl ions further comprise a bipolar membrane,
   said electrolysis cell comprises multiple pairs of said first and said second compartment separated by said anion exchange membrane, and
   the second compartment of one pair is separated at its anode side from the first compartment of an adjacent pair by said bipolar membrane.

6. The process according to claim 1, wherein said electrolysis is carried out in multiple cells connected in parallel or in series using electrical wiring.

7. The process according to claim 1, wherein
said electrolysis is carried out in multiple cells connected in series,
said means for producing protons and said means for producing hydroxyl ions further comprise bipolar electrodes connecting adjacent cells, and
said bipolar electrodes function as an anode for one cell at one side and as a cathode for the adjacent cell at the other side.

8. The process according to claim 1, wherein the pH of said alkaline sulfidic liquid is between and 14 and the pH of said sulfide-enriched concentrate is between 7.5 and 9.5.

9. A process for removing sulfidic components from a hydrocarbon fluid, comprising:
contacting the hydrocarbon fluid with an aqueous alkaline liquid having a pH of at least 11;
treating the alkaline sulfidic liquid to remove sulfide by the process of claim 1; and
returning the sulfide reduced dilute to said contacting.

10. A system for the treatment of sulfidic alkaline liquids, comprising:
(a) an electrolysis cell comprising a means for producing protons having an anode, a means for producing hydroxyl ions having a cathode, an electric power supply, an anion exchange membrane separating a first compartment at the cathode side of the membrane and a second compartment at the anode side of the membrane,
said first compartment being provided with a liquid inlet and a liquid outlet, and said second compartment being provided with a liquid outlet and a liquid inlet,
said means for producing protons and said second compartment being arranged such that protons produced by said means for producing protons can move to said second compartment; and
(b) a biological sulfide oxidation reactor provided with a liquid inlet and a liquid outlet, which are connected to said liquid outlet and liquid inlet, respectively, of said second compartment, and provided with an air inlet, an air distribution device and a gas outlet.

11. The system according to claim 10, wherein said electrolysis cell further comprises a third compartment at the anode side of the second compartment, said third compartment separated from said second compartment by a cation exchange membrane or a bipolar membrane.

12. The system according to claim 10, wherein
said means for producing protons and said means for producing hydroxyl ions further comprise a bipolar membrane, and
said electrolysis cell further comprises a fourth compartment at the cathode side of the first compartment, said fourth compartment separated from said first compartment by said bipolar membrane.

13. The system according to claim 12, wherein said electrolysis cell comprises multiple alternating pairs of said first and said second compartments being separated from the first compartment at its cathode side by said anion exchange membrane and from the first compartment at its anode side by said bipolar membrane.

14. The system according to claim 10, comprising multiple electrolysis cells, wherein said means for producing protons and said means for producing hydroxyl ions further comprise bipolar electrodes connecting adjacent cells, and
said bipolar electrodes function as an anode for one cell on one side and as a cathode for the adjacent cell on the other side.

15. The system according to claim 10, further comprising a scrubber, said scrubber comprising:
a liquid outlet and a liquid inlet, said liquid outlet and liquid inlet of the scrubber being connected to said liquid inlet and liquid outlet, respectively, of said first compartment, and
a fluid inlet and a fluid outlet.

16. The system according to claim 11, wherein said electrolysis cell further comprises a fourth compartment at the cathode side of the first compartment and separated from said first compartment by a bipolar membrane.

17. The process according to claim 2, comprising:
carrying out said biological oxidation under conditions allowing selective oxidation of the sulfides to elemental sulfur,
separating off the sulfur as a solid, and
returning the sulfide-depleted liquid effluent to the electrolysis step.

18. The process according to claim 2, wherein said electrolysis cell comprises at least three compartments:
a first compartment into which the alkaline sulfidic liquid is introduced and from which the sulfide-reduced diluate is carried off;
a second compartment, at the anode side of said first compartment and separated from said first compartment by said anion exchange membrane, from which the sulfide-enriched concentrate is carried off; and
a third compartment, at the anode side of said second compartment and separated from said second compartment by a cation exchange membrane or a bipolar membrane.

19. The process according to claim 3, wherein said electrolysis cell comprises at least three compartments:
a first compartment into which the sulfidic liquid is introduced and from which the diluate is carried off;
a second compartment, at the anode side of said first compartment and separated from said first compartment by said anion exchange membrane, from which the sulfide-enriched concentrate is carried off; and
a third compartment, at the anode side of said second compartment and separated from said second compartment by a cation exchange membrane or a bipolar membrane.

20. The process according to claim 17, wherein said electrolysis cell comprises at least three compartments:
a first compartment into which the sulfidic liquid is introduced and from which the diluate is carried off;
a second compartment, at the anode side of said first compartment and separated from said first compartment by said anion exchange membrane, from which the sulfide-enriched concentrate is carried off; and
a third compartment, at the anode side of said second compartment and separated from said second compartment by a cation exchange membrane or a bipolar membrane.

* * * * *

UNITED STATES PATENT AND TRADEMARK OFFICE
CERTIFICATE OF CORRECTION

PATENT NO. : 8,715,504 B2
APPLICATION NO. : 12/809728
DATED : May 6, 2014
INVENTOR(S) : Rozendal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-ninth Day of September, 2015

Michelle K. Lee
*Director of the United States Patent and Trademark Office*